(12) United States Patent
John et al.

(10) Patent No.: US 8,930,426 B2
(45) Date of Patent: Jan. 6, 2015

(54) DISTRIBUTED REQUESTS ON REMOTE DATA

(75) Inventors: Peter John, Neckargemuend (DE); Martin Guenther, Karlsdorf-Neuthard (DE)

(73) Assignee: SAP SE, Walldorf (DE)

( * ) Notice: Subject to any disclaimer, the term of this patent is extended or adjusted under 35 U.S.C. 154(b) by 178 days.

(21) Appl. No.: 13/171,494

(22) Filed: Jun. 29, 2011

(65) Prior Publication Data
US 2013/0007040 A1 Jan. 3, 2013

(51) Int. Cl.
*G06F 7/00* (2006.01)
*G06F 17/00* (2006.01)
*G06F 17/30* (2006.01)

(52) U.S. Cl.
CPC ............................... *G06F 17/30545* (2013.01)
USPC ............................ 707/899; 707/601; 707/607

(58) Field of Classification Search
CPC .......... G06F 17/3033; G06F 17/30516; G06F 17/30545
USPC ........... 707/602, 722, 747; 709/224; 340/10.1
See application file for complete search history.

(56) References Cited

U.S. PATENT DOCUMENTS

| | | | | |
|---|---|---|---|---|
| 6,282,546 B1 * | 8/2001 | Gleichauf et al. | | 726/25 |
| 6,430,595 B1 * | 8/2002 | Ferguson et al. | | 709/200 |
| 8,214,325 B2 * | 7/2012 | Navas | | 707/602 |
| 8,412,746 B2 * | 4/2013 | Fox et al. | | 707/803 |
| 2003/0069795 A1 * | 4/2003 | Boyd et al. | | 705/22 |
| 2008/0129452 A1 * | 6/2008 | Agrawal et al. | | 340/10.1 |
| 2010/0125574 A1 * | 5/2010 | Navas | | 707/722 |
| 2010/0125584 A1 * | 5/2010 | Navas | | 707/747 |
| 2010/0318652 A1 * | 12/2010 | Samba | | 709/224 |

* cited by examiner

*Primary Examiner* — Susan Chen (57) ABSTRACT

Various embodiments of systems and methods for communicating with a plurality of remote systems are described herein. A remote data query is sent from a central data requesting system to remote systems. A query result is received asynchronously from at least one of the remote systems. The remote systems may include data pools which are independent of each other. In one embodiment, the remote systems include a responsive remote system and an unresponsive remote system, and the query result is received from the responsive remote system. In one embodiment, a predetermined timeout period is set at the central data requesting system and the query result obtained after the pre-determined timeout period is ignored by the central data requesting system.

9 Claims, 13 Drawing Sheets

| SYSTEM IDENTIFICATION ||
|---|---|
| SELECT | REMOTE SYSTEMS |
| X | S1     408 |
| X | S2     410 |
| X | S3     412 |
| X | S4     414 |
| X | S5     416 |
| X | S6     418 |
| X | S7     420 |
| X | S8     422 |

FIG. 13

DISTRIBUTED REQUESTS ON REMOTE DATA

FIELD

Embodiments generally relate to computer systems, and more particularly to methods and systems for communication with remote systems.

BACKGROUND

Large enterprises have a huge amount of data stored on remote systems, such as customer systems or mobile devices. Usually these enterprises want to query the remote systems for the remote data. Typically, the data from all the remote systems are transferred to a central system, located at the enterprise, which is then queried for the remote data. However, downloading the remote data to the central system causes a huge data load at the central system which is undesirable.

Furthermore, remote systems may store data in distributed databases which allow the enterprise to query the remote data at the remote system itself. However, distributed databases are defined by strict rules (12+1 rule) such as: availability: all the remote systems should be "live" when the query is sent to the remote systems, consistency: whenever the remote data is changed in one of the distributed database the change should be updated in other distributed databases as well, etc.

In some cases, the query sent to the remote systems might be statistical in nature, which does not require the remote data, stored at the remote systems, to be defined by such strict rules. Therefore, there is a need for a system and method that allows enterprises to easily query data stored in remote systems.

SUMMARY

Various embodiments of systems and methods for distributed requests on remote data are described herein.

In one aspect, a remote data query is sent from a central data requesting system to one or more of the plurality of remote systems.

In another aspect, a query result is received asynchronously, at the central data requesting system, from at least one of the plurality of remote systems.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Embodiments of techniques for distributed requests on remote data are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Figure 1:
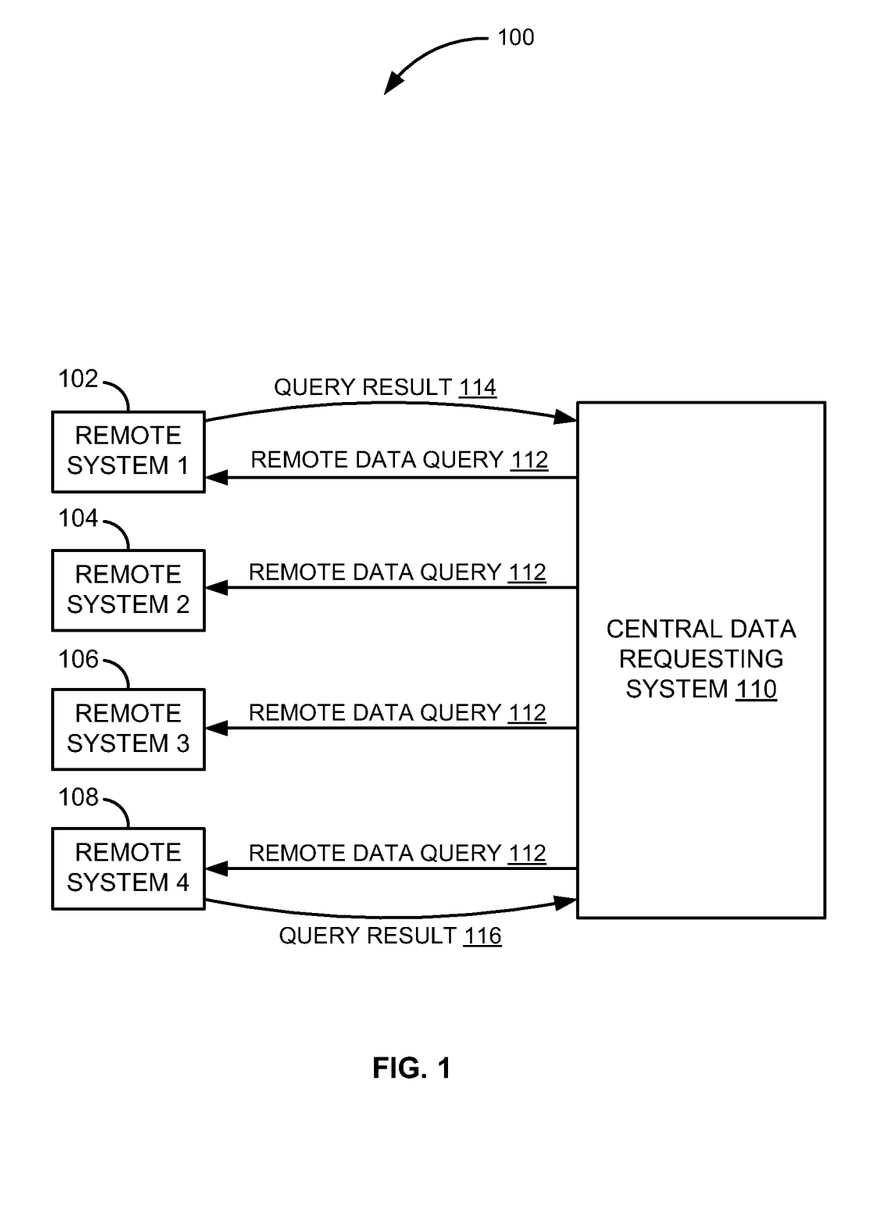
FIG. 1 is a block diagram illustrating a communication system, according to an embodiment.

FIG. 1 is a block diagram illustrating a communication system 100, according to an embodiment. As shown, the communication system 100 includes a remote system 1 102, a remote system 2 104, a remote system 3 106, and a remote system 4 108. The remote system 1 102, the remote system 2 104, the remote system 3 106, and the remote system 4 108 may store data. The remote systems 102-108 may, computer systems, mobile devices, or short/called "Nodes".

The communication system 100 includes a central data requesting system 110 that sends a remote data query 112 to the remote system 1 102, the remote system 2 104, the remote system 3 106, and the remote system 4 108. As shown, the central data requesting system 110 sends the remote data query 112 in parallel to the remote system 1 102, the remote system 2 104, the remote system 3 106, and the remote system 4 108. In one embodiment, the central data requesting system 110 sends the remote data query 112 in series to the remote system 1 102, the remote system 2 104, the remote system 3 106, and the remote system 4 108. The remote data query 112 may be a query on the data stored in the remote system 1 102, the remote system 2 104, the remote system 3 106, and the remote system 4 108. Based on the received remote data query 112, the remote system 1 102 and the remote system 4 108 send query result 114 and query result 116, respectively to the central data requesting system 110.

Figure 2:
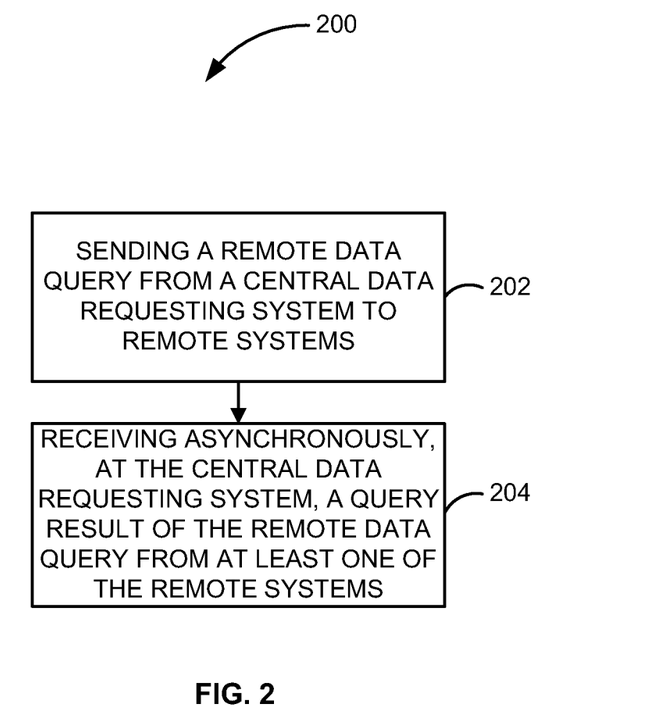
FIG. 2 is a flow diagram illustrating a method for communicating with remote systems, according to an embodiment.

FIG. 2 is a flow diagram 200 illustrating a method for communicating with remote systems, according to an embodiment. Initially at block 202, the central data requesting system may send a remote data query to remote systems. In one embodiment, the remote data query is a statistical query. For example, the remote data query may be a query about the number of local programs stored at the remote systems, the different hardware at the remote systems, etc.

Next at block 204, at least one of the remote systems, which received the remote data query, may send the query result to the central data requesting system. According to one embodiment, the remote systems send the query result asynchronously to the central data requesting system, i.e., the query results from the different remote systems are independent of each other, and it does not matter if some of the remote systems, which received the remote data query, do not send the query results to the central data requesting system.

The central data requesting system may then analyze the query result received from the remote systems. Since the remote data query sent by the central data requesting system is statistical in nature, the central data requesting can analyze the query result even though only one of the remote systems provides the query result, i.e., even though only one of the remote systems responds to the remote data query.

For example, consider that the central data requesting system sends the remote data query to five remote systems for inquiring about an average usage of a particular hardware on these five remote systems. Suppose that the central data requesting system receives query result from only two of these five remote systems. The central data requesting system can analyze the query results obtained from the two remote systems to derive the average usage of the particular hardware on the remote systems. Since the remote data query is statistical in nature the central data requesting system does not require the query results from all the five remote systems.

Figure 3:
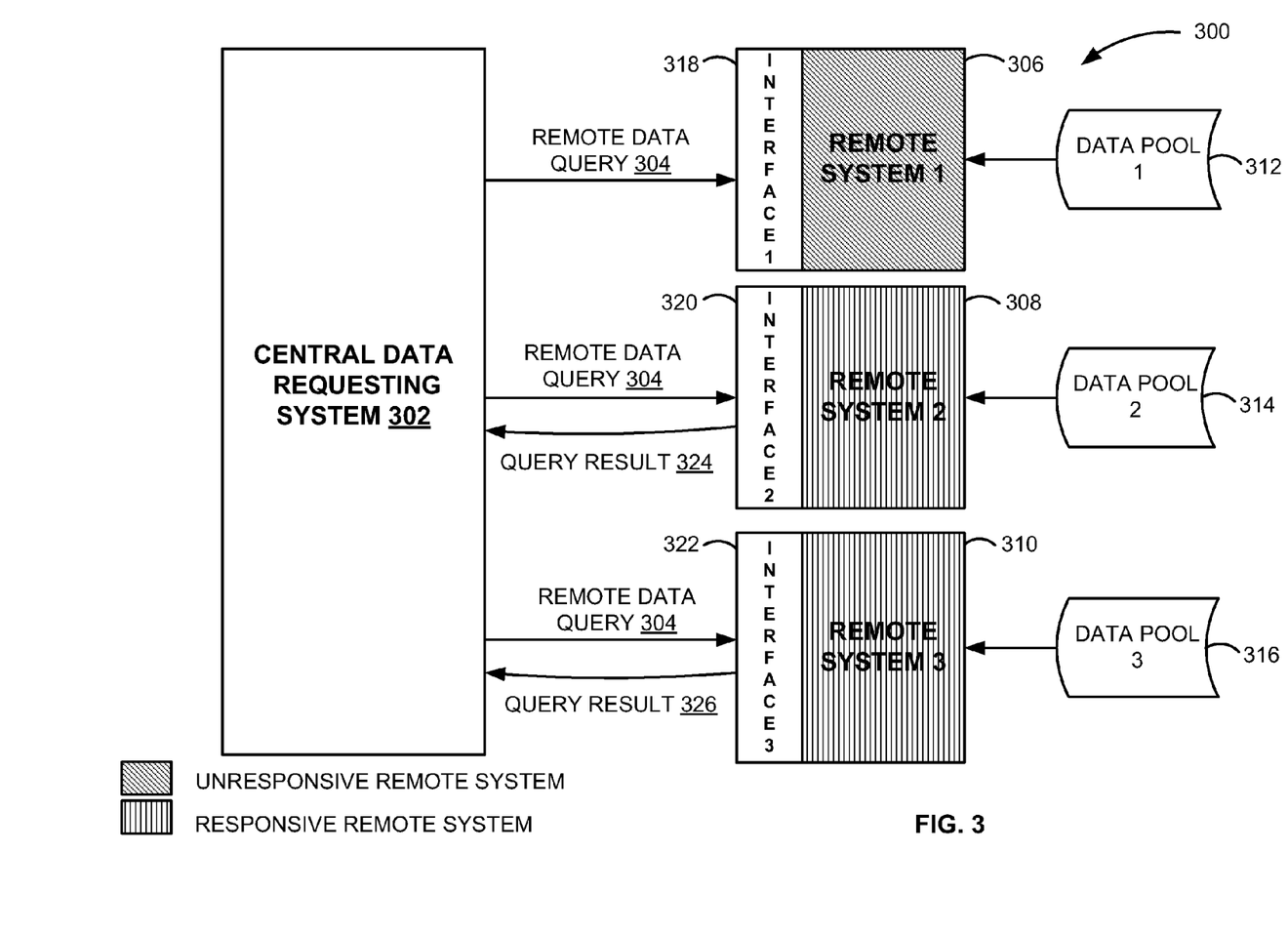
FIG. 3 is a detailed block diagram of a communication system, according to an embodiment.

FIG. 3 is a detailed block diagram of a communication system 300, according to an embodiment. The communication system 300 includes a central data requesting system 302 for formulating a remote data query 304. The central data requesting system 302 may include a user interface for allowing an end user to formulate the remote data query 304. In one embodiment, the remote data query 304 may be formulated in any of the query languages. For example, the remote data query 304 may be formulated as a SQL (Structured Query Language) query, an ABAP (Advanced Business Application Programming) query, etc. In another embodiment, the remote data query 304 may be a program for example a "repair" program that may be defined to repair a system.

The communication system 300 also includes a remote system 1 306, a remote system 2 308, and a remote system 3 310. Each of the remote system 1 306, the remote system 2 308, and the remote system 3 310 may include a data pool 1 312, a data pool 2 314, and a data pool 3 316, respectively. The data pool 1 312, the data pool 2 314, and the data pool 3 316 may store data related to the remote system 1 306, the remote system 2 308, and the remote system 3 310, respectively. The data pool 1 312, the data pool 2 314, and the data pool 3 316 may include any source of data. For example, the data pools 312-316 may be a database such as a relational database or an in-memory database. The data pool 1 312, the data pool 2 314, and the data pool 3 316 are independent of each other, i.e., the data in any of the data pools 1-3 (312-316) are not dependent on each other and can be different. For example, if the data in the data pool 1 312 is edited or updated, this change is not required to be replicated in the data pool 2 314 and the data pool 3 316.

The remote system 1 306, the remote system 2 308, and the remote system 3 310 also include an interface 1 318, an interface 2 320, and an interface 3 322, respectively. The interface 1 318, the interface 2 320, and the interface 3 322 converts the remote data query 304 into a language understood by the remote system 1 306, the remote system 2 308, and the remote system 3 310, respectively. For example, the remote data query 304 might be defined in "Open SQL" which is converted by the interface 1 318, the interface 2 320, and the interface 3 322 to "Native SQL" that is understood by the remote system 1 306, the remote system 2 308, and the remote system 3 310. In one embodiment, the interface 1 318, the interface 2 320, and the interface 3 322 are a database management system (DBMS). In another embodiment, the interface 1 318, the interface 2 320, and the interface 3 322 may be an ABAP interpreter.

The remote system 1 306, the remote system 2 308, and the remote system 3310 may also include a result processing module for executing the remote data query 304 received from the central data requesting system 302. Executing the remote data query 304 at the remote system 1 306, the remote system 2 308, and the remote system 3 310 may include accessing the data pool 1 312, the data pool 2 314, and the data pool 3 316, respectively, for obtaining the query result of the remote data query 304. The result processing module may be for example a database engine that may be used to create, read, update, and delete data from the data pool 1 312, the data pool 2 314, and the data pool 3 316. In one embodiment, the query result may be a data, such as a database table, which has been requested for, in the remote data query 304. In another embodiment, when the remote data query 304 is the repair program, the query result may be "successful" or "unsuccessful" depending on whether the repair program was executed successfully or unsuccessfully at the remote system 1 306, the remote system 2 308, and the remote system 3 310.

In one embodiment, each of the remote system 1 306, the remote system 2 308, and the remote system 3 310 may include a collecting module for collecting data of the remote system 1 306, the remote system 2 308, and the remote system 3 310 and storing the collected data in the data pool 1 312, the data pool 2 314, and the data pool 3 316, respectively. The collecting module may be for example Solution Manager, provided by SAP AG, of Walldorf, Germany.

A communication is established between the central data requesting system 302 and the remote system 1 306, the remote system 2 308, and the remote system 3 310. The communication established between the central data requesting system 302 and the remote system 1 306, the remote system 2 308, and the remote system 3 310 may be a wired connection or a wireless connection. The central data requesting system 302 may send the remote data query 304 to the remote system 1 306, the remote system 2 308, and the remote system 3 310 via the established communication. The remote system 1 306, the remote system 2 308, and the remote system 3 310 may send the query result for the remote data query 304 via the established communication. The remote system 1 306, the remote system 2 308, and the remote system 3 310 may send the query result independently to the central data requesting system 302.

In one embodiment, the central data requesting system 302 may send the remote data query 304 to the remote systems 1 306, the remote system 2 308, and the remote system 3 310 using any asynchronous communication protocol, i.e., the central data requesting system 302 does not wait for receiving the query result from the remote system 1 306, the remote system 2 308, and the remote system 3 310 after sending the remote data query 304 to the remote system 1 306, the remote system 2 308, and the remote system 3 310, respectively. For example, the central data requesting system 302 may send the remote data query 304, to the remote system 1 306, the remote system 2 308, and the remote system 3 310 using the asynchronous remote function call (aRFC) protocol. The remote system 1 306, the remote system 2 308, and the remote system 3 310 may also send the query result of the remote data query 304 to the central data requesting system 302 using the asynchronous communication protocol.

In another embodiment, the central data requesting system 302 may send the remote data query 304 to the remote system 1 306, the remote system 2 308, and the remote system 3 310 using a communication protocol that has a timeout exit strategy. For example, the central data requesting system 302 may send the remote data query 304 to the remote system 1 306, the remote system 2 308, and the remote system 3 310 as a Hypertext Transfer Protocol (HTTP) request. In this case, the central data requesting system 302 waits for a certain time to receive a reply (query result) for the HTTP request (remote data query 304), if the remote system 1 306, the remote system 2 308, and the remote system 3 310 do not reply to the HTTP request before the time then the HTTP request ends in a "timeout".

The central data requesting system 302 may wait for a pre-determined timeout for receiving the query result from the remote system 1 306, the remote system 2 308, and the remote system 3 310. In one embodiment, the pre-determined timeout may be set by an end user at the central data requesting system 302. The central data requesting system 302 only accepts the query result obtained before this pre-determined timeout.

In one embodiment, one or more of the remote systems, i.e., the remote system 1 306, the remote system 2 308, and the remote system 3 310, are not responsive, when the remote data query 304 is sent to the remote system 1 306, the remote 2 308, and the remote system 3 310. This may be due to several reasons, for example if one of the remote system 1 306, the remote system 2 308, or the remote system 3 310 is shutdown. As shown, the remote system 1 306 is unresponsive, i.e., not responding to the remote data query 304, the remote system 2 308 and the remote system 3 310 are responsive. The central data requesting system 302 receives the query result 324 and the query result 326 from the responsive remote system 2 308 and the responsive remote system 3 310.

Finally, the central data requesting system 302 analyzes the query result 324 and the query result 326. Analyzing the query results 324 and 326 by the central data requesting system 302 may include listing the query results 324 and 326 on a user interface at the central data requesting system 302, counting the number of rows in the query result 324 and 326, or generating and presenting a graph based on the received query results 324 and 326.

Figure 4:
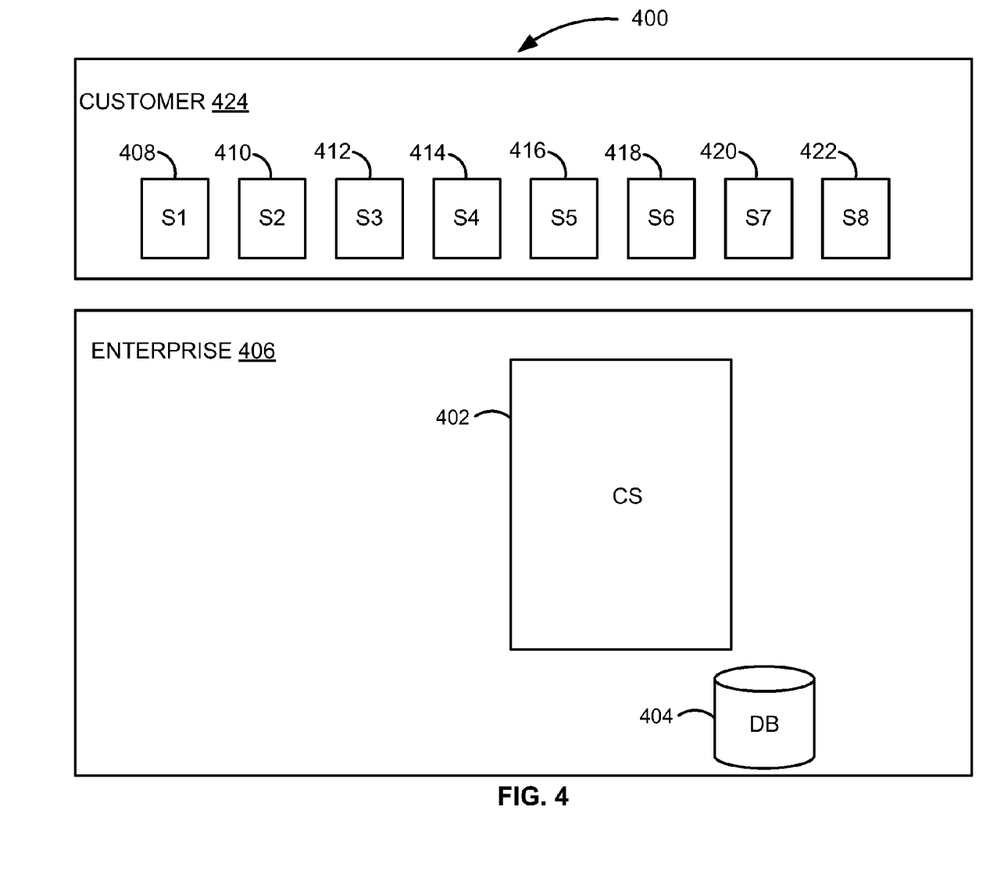
FIG. 4 illustrates a block diagram of an exemplary communication system, according to an embodiment.

FIG. 4 illustrates a block diagram of an exemplary communication system 400, according to an embodiment. The communication system 400 includes a central data requesting system "CS" 402 and a database (DB) 404, located at an enterprise 406. The central data requesting system "CS" 402 may include a user interface for formulating the remote data query. The central data requesting system "CS" 402 may store the query result in the database 404.

The communication system 400 also includes a remote system "S1" 408, a remote system "S2" 410, a remote system "S3" 412, a remote system "S4" 414, a remote system "S5" 416, a remote system "S6" 418, a remote system "S7" 420, and a remote system "S8" 422, at a customer 424 end. The remote systems 408-422 may store remote data. The remote systems 408-422 may execute the remote data query to obtain the query result.

Figure 5:
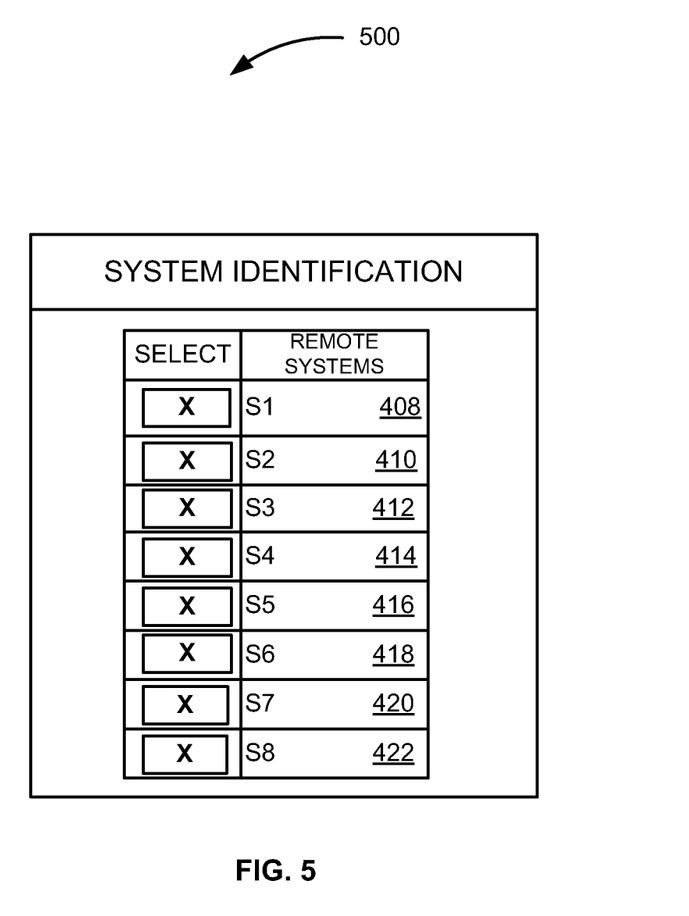
FIG. 5 illustrates a list of remote systems presented at a central data requesting system of the exemplary communication system, according to an embodiment.

FIG. 5 illustrates a list 500 of remote systems 408-422 of FIG. 4 presented at the central data requesting system "CS" 402 of FIG. 4, according to an embodiment. The list 500 of the remote systems 408-422 may be presented at the user interface of the central data requesting system "CS" 402. A user manually selects one or more of the remote systems 408-422 from the list 500 to which the remote data query is to be sent. As shown, all the remote systems, i.e., the remote system "S1" 408, the remote system "S2" 410, the remote system "S3" 412, the remote system "S4" 414, the remote system "S5" 416, the remote system "S6" 418, the remote system "S7" 420, and the remote system "S8" 422 are selected by the end user for sending the remote data query.

Figure 6:
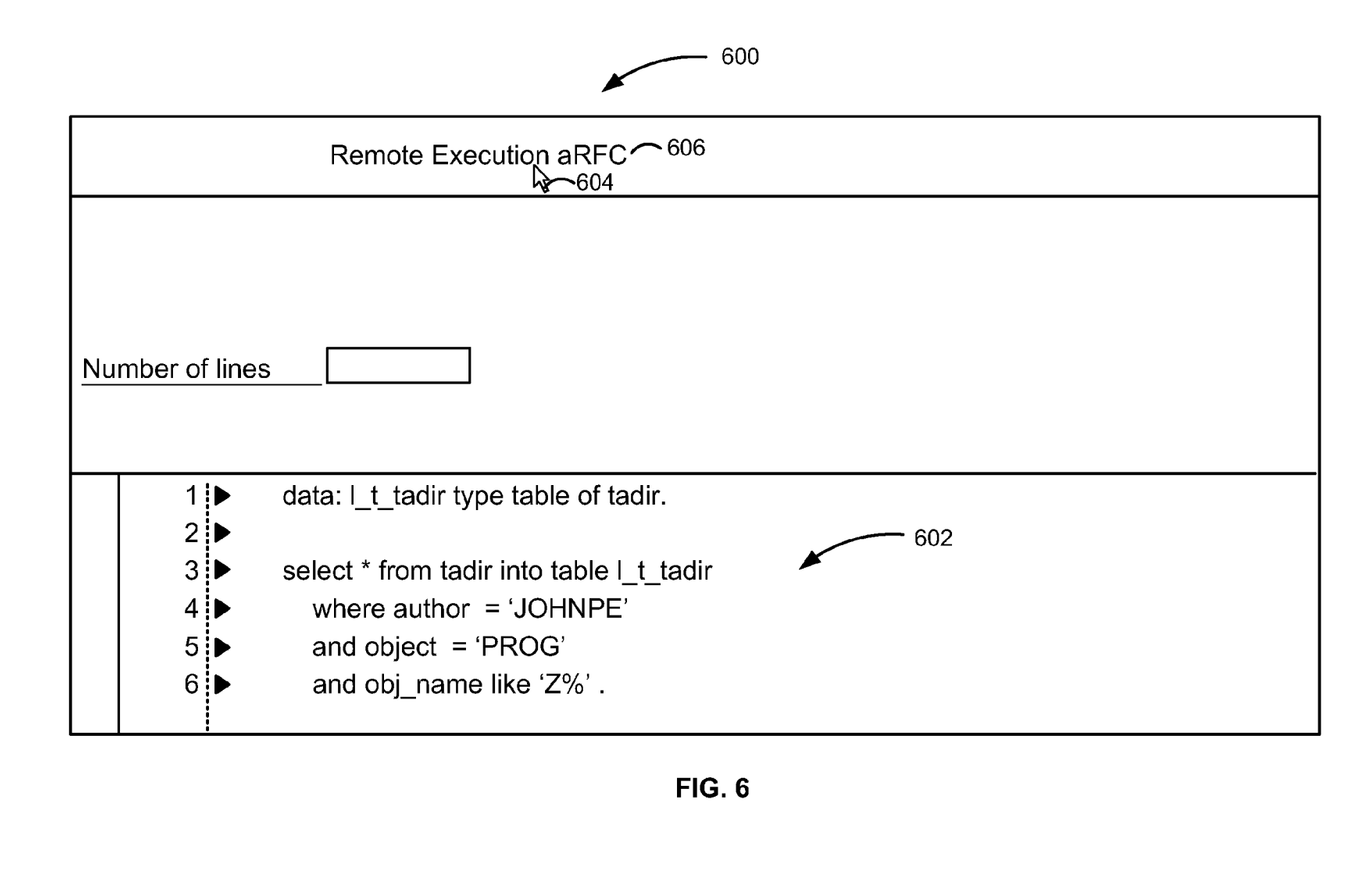
FIG. 6 illustrates a user interface presented at the central data requesting system for formulating the remote data query, according to an embodiment.

FIG. 6 illustrates a user interface 600 presented at the central data requesting system "CS" 402 of FIG. 4 for formulating a remote data query 602, according to an embodiment. As shown, the remote data query 602 is a select command for selecting a table. The remote data query 602 searches for all test programs ("PROG") on the remote systems 408-422 selected in FIG. 5, which have a name (obj_name) starting with "Z" and author as "JOHNPE". The remote data query 602 is formulated by the end user in OPEN SQL. The end user may also set 10 minutes, as a pre-determined timeout, for receiving the query result from the remote systems 408-422 selected in FIG. 5. After formulating the remote data query 602 the end user clicks 604 on "Remote Execution aRFC" option 606 on the user interface 600 for sending the remote data query to the remote systems 408-422.

Figure 7:
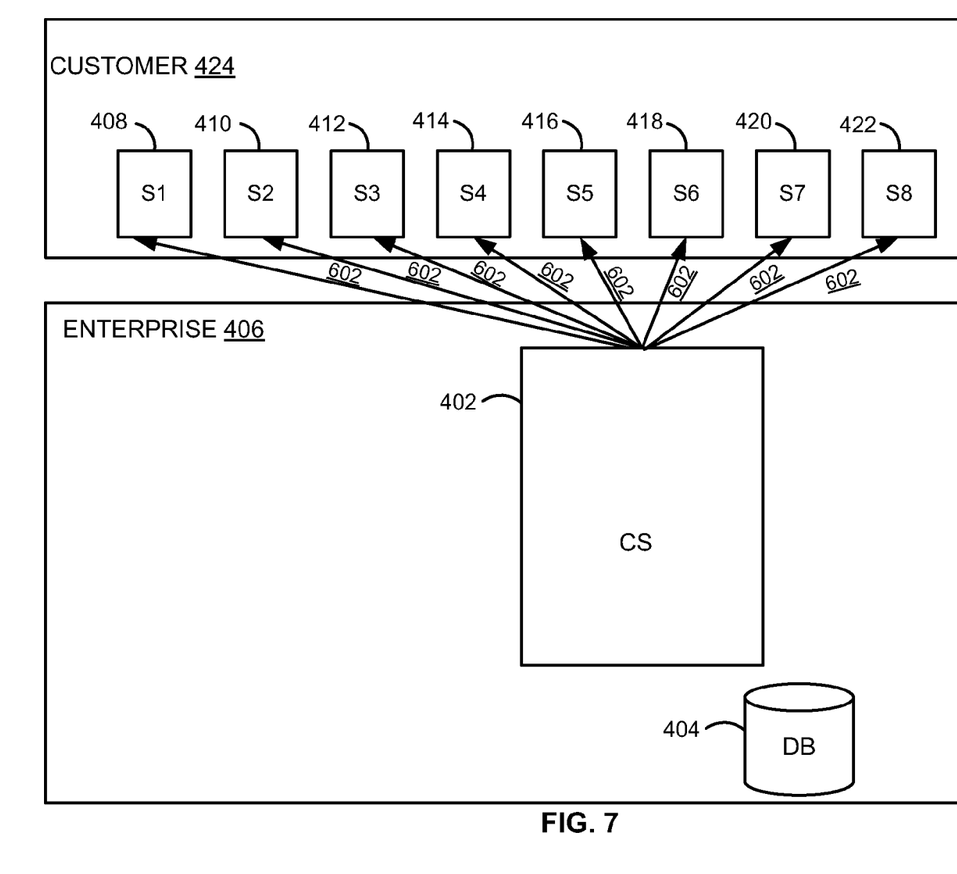
FIG. 7 illustrates the remote data query formulated in FIG. 6 being sent to the remote systems, according to an embodiment.

FIG. 7 illustrates the remote data query 602 formulated in FIG. 6 being sent to the remote systems 408-422, according to an embodiment. As shown, the central data requesting system "CS" 402 sends the remote data query 602 in parallel to the remote systems 408-422 selected in FIG. 5. The central data requesting system "CS" 402 sends the remote data query 602 using the asynchronous remote function call (aRFC) protocol, i.e., the central data requesting system "CS" 402 does not wait for receiving the query results from the remote systems 408-422.

Figure 8:
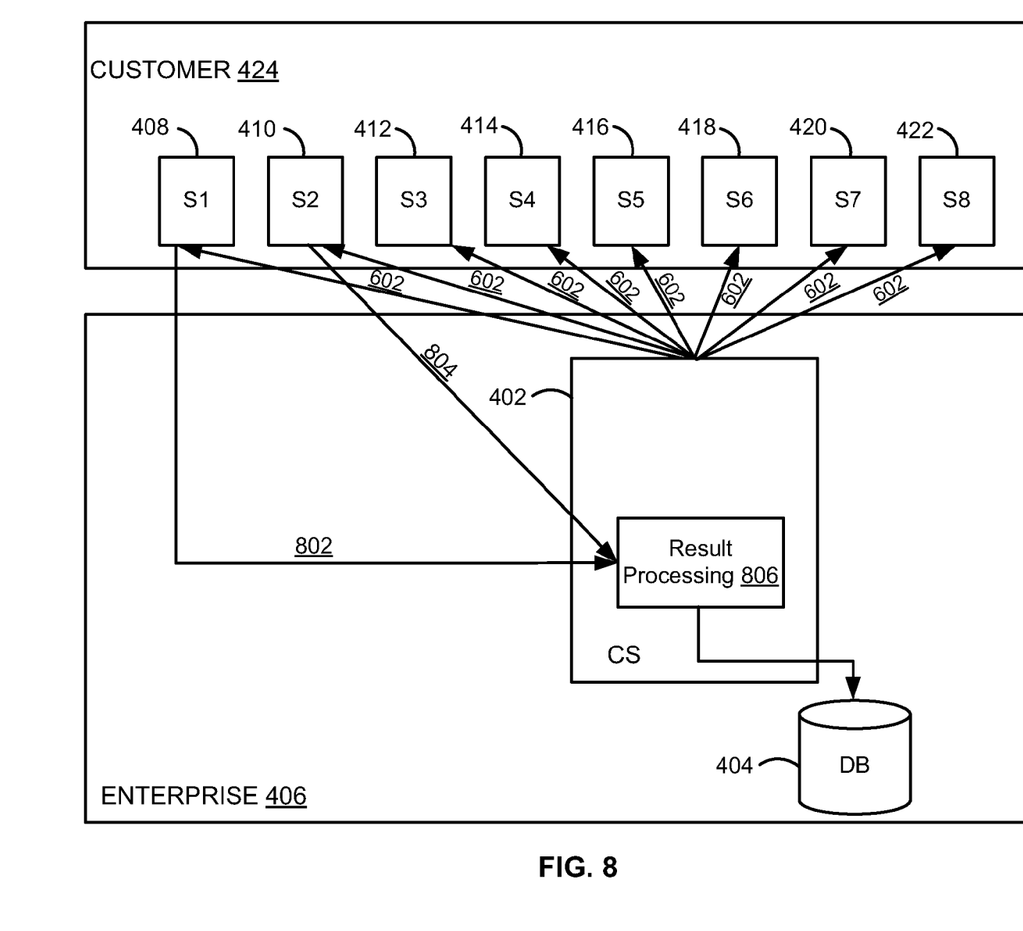
FIG. 8 illustrates the query results received, 5 minutes after sending the remote data query to the remote systems, according to an embodiment.

FIG. 8 illustrates query results 802 and 804 received, 5 minutes after sending the remote data query 602 to the remote systems 408-422, at the central data requesting system "CS" 402 of FIG. 4, according to an embodiment. As shown, the remote system "S1" 408 and the remote system "S2" 410 provide the query results 802 and 804, respectively, for the remote data query 602 to the central data requesting system "CS" 402. The remote system "S1" 408 and the remote system "S2" 410 may execute the remote data query 602 to search for all test programs, starting with "Z" and having author as "JOHNPE". The remote system "S1" 408 and the remote system "S2" 410 may respond in any order, i.e., the remote system "S2" 410 may send the query result 804 to the central data requesting system "CS" 402 before or after the remote system "S1" 408 sends the query result 802 to the central data requesting system "CS" 402. The remaining remote systems 412-422 may be unresponsive or may still be executing the remote data query 602.

The query results 802 and 804 received from the remote system "S1" 408 and the remote system "S2" 410 may be received at a result processing module 806 of the central data requesting system "CS" 402. The result processing module 806 stores the received query results 802 and 804 in the database 404. The query results 802 and 804 may be a list of test programs, which have name starting with "Z" and author as "JOHNPE", stored in the remote system "S1" 408 and the remote system "S2" 410.

Figure 9:
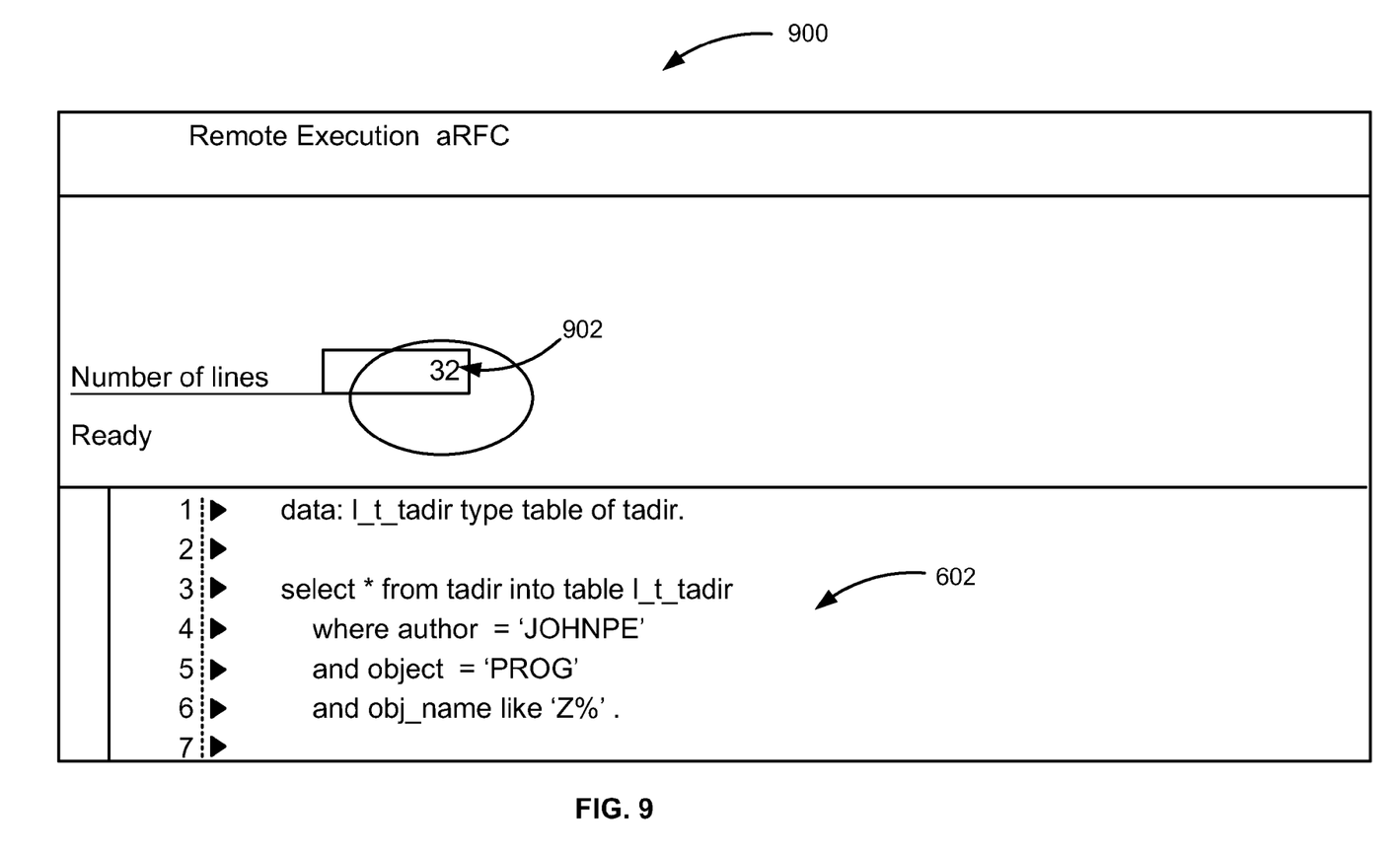
FIG. 9 illustrates a user interface presented at the central data requesting system, 5 minutes after sending the remote data query to the remote systems, according to an embodiment.

FIG. 9 illustrates a user interface 900 presented at the central data requesting system "CS" 402 of FIG. 4, 5 minutes after sending the remote data query to the remote systems, according to an embodiment. As discussed above, the central data requesting system "CS" 402 of FIG. 4 receives the query results, which may be the list of test programs, from the remote system "S1" and the remote system "S2". The user interface 900 displays a "number of lines" 902, which indicates the number of result lines in the list received from the remote system "S1" and the remote system "S2", i.e., the number of test programs in the remote system "S1" and the remote system "S2". As shown, the number of lines 902 is 32, i.e., the remote system S1 and the remote system "S2" have 32 test programs, which have the name starting with "Z" and author as "JOHNPE".

Figure 10:
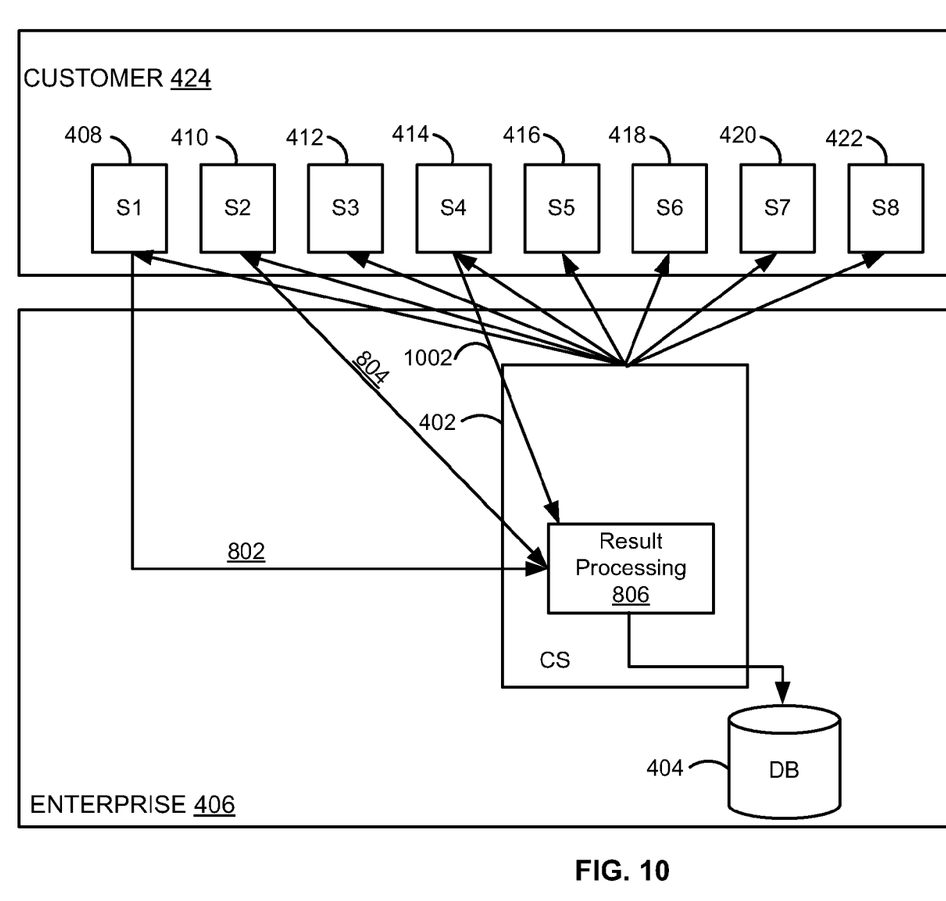
FIG. 10 illustrates the remote data queries received, at timeout, at the central data requesting system, according to an embodiment.

FIG. 10 illustrates the remote data queries 802, 804, and 1002 received, at timeout, at the central data requesting system "CS" 402 of FIG. 4, according to an embodiment. As discussed above in FIG. 8, the central data requesting system "CS" 402 receives the query results 802 and 804 from the remote system "S1" 408 and the remote system "S2" 410, respectively. The central data requesting system "CS" 402 receives a query result 1002 from another remote system "S4" 414 before the timeout, i.e., 10 minutes. Therefore, at timeout the central data requesting system "CS" 402 has the query results 802, 804, and 1002 from the remote system "S1" 408, the remote system "S2" 410, and the remote system "S4" 414, respectively. The query results 802, 804, and 1002 may be the list of test programs, which have name starting with "Z" and author as "JOHNPE", stored in the remote system "S1" 408, the remote system "S2" 410, and the remote system "S4" 414.

A query result from any of the remaining remote systems, i.e., the remote system "S3" 412, the remote system "S5" 416, the remote system "S6" 418, the remote system "S7" 420, and the remote system "S8" 422, received after the timeout period is ignored by the central data requesting system "CS" 402. The result processing module 806 stores the query result 1002 received from the remote system "S4" 414 in the database 404.

Figure 11:
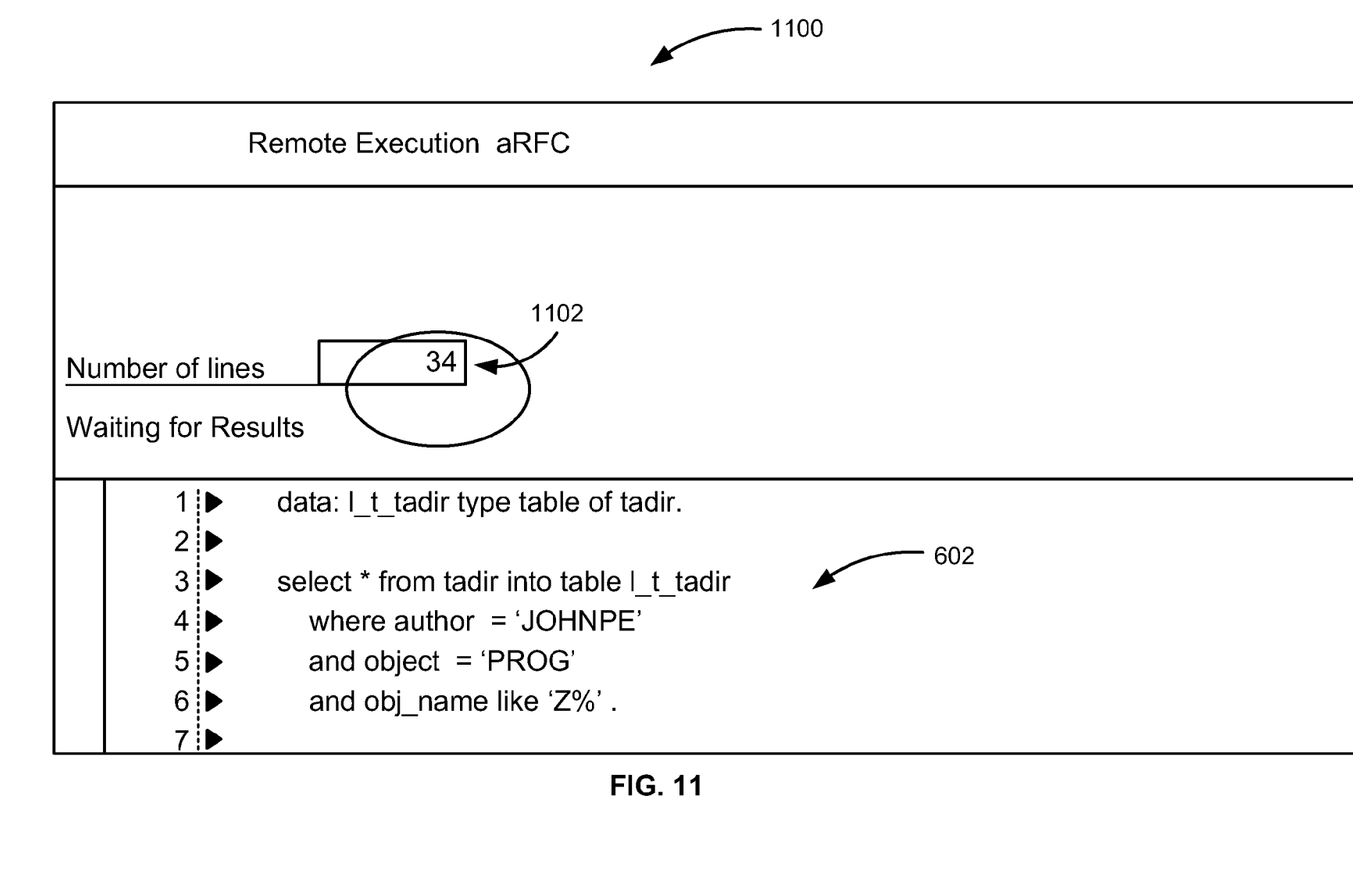
FIG. 11 illustrates a user interface presented at the central data requesting system of FIG. 4 at timeout, according to an embodiment.

FIG. 11 illustrates a user interface 1100 displayed, at timeout, at the central data requesting system "CS" 402 of FIG. 4, according to an embodiment. As discussed above in FIG. 10, at timeout the central data requesting system "CS" 402 receives the query results 802, 804, and 1002, from the remote system "S1" 408, the remote system "S2" 410, and the remote system "S4" 414, respectively. The user interface 1100 displays a "number of lines" 1102, which indicates the number of lines in the query results 802, 804, and 1002 received at the central data requesting system "CS" 402. As shown, the number of lines 1102 is 34, i.e., the remote system "S1" 408, the remote system "S2" 410, and the remote system "S4" 414 have 34 test programs, which have the name starting with "Z" and author as "JOHNPE".

Figure 12:
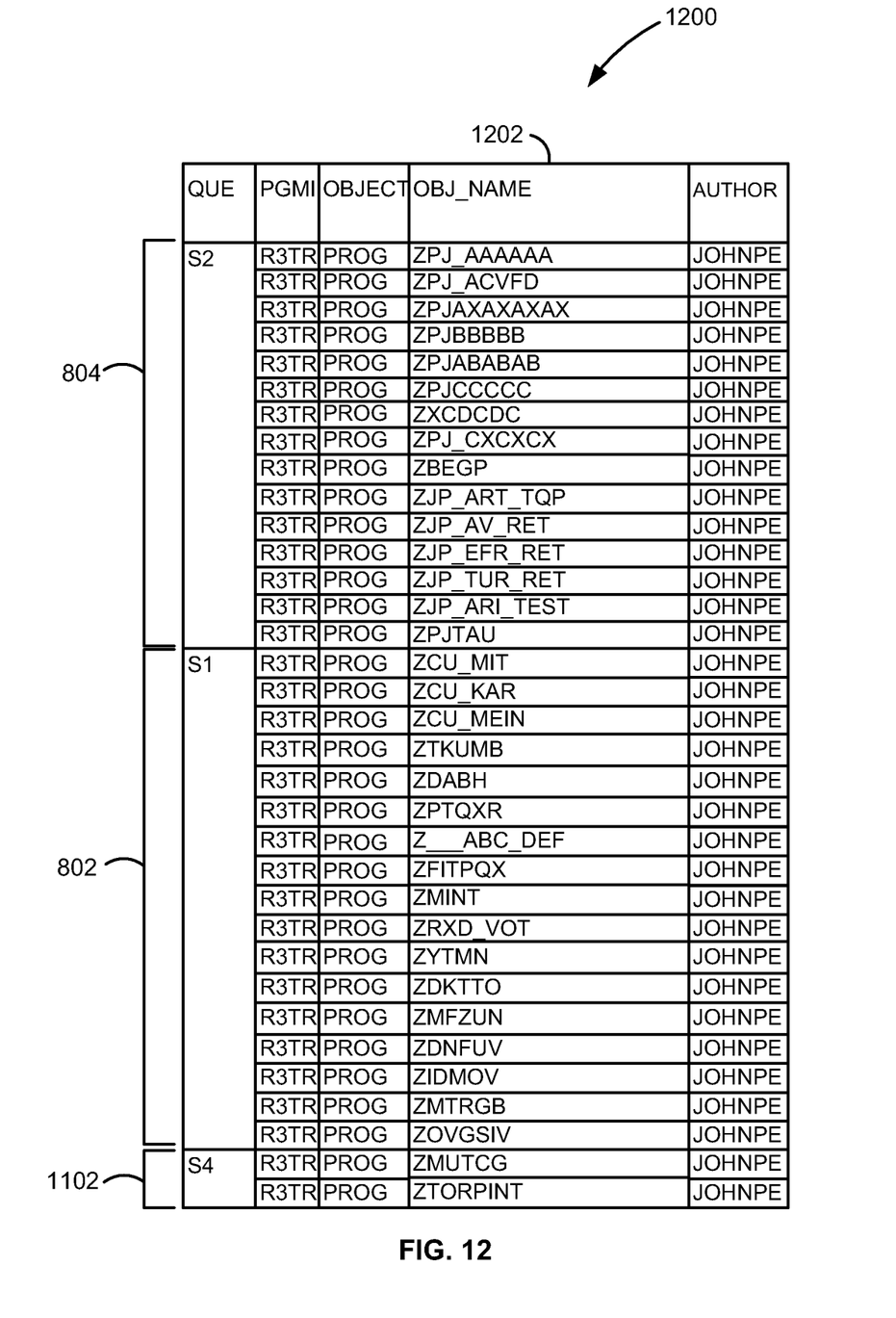
FIG. 12 illustrates a list displayed at the central data requesting system after analyzing the received query results, according to an embodiment.

FIG. 12 illustrates a list 1200 displayed at the central data requesting system "CS" 402 of FIG. 4 after analyzing the received query results, according to an embodiment. As discussed above in FIG. 10, the central data requesting system "CS" 402 receives the query results 802, 804, and 1102 from the remote system "S1" 408, the remote system "S2" 410, and the remote system "S4" 414, respectively. After receiving the query results 802, 804, and 1102, the central data requesting system "CS" 402 starts analyzing the query results 802, 804, and 1102. In the exemplary embodiment, the query results 802, 804, and 1102 are presented at the central data requesting system "CS" 402 as the list 1200. As shown, the list 1200 is a collection of the query results 802, 804, and 1102. The list 1200 includes a name (OBJ_NAME) 1202 of all the test programs in the remote systems "S1", "S2" and "S4", which have their name starting with "Z" and author as "JOHNPE".

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components may be implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 13:
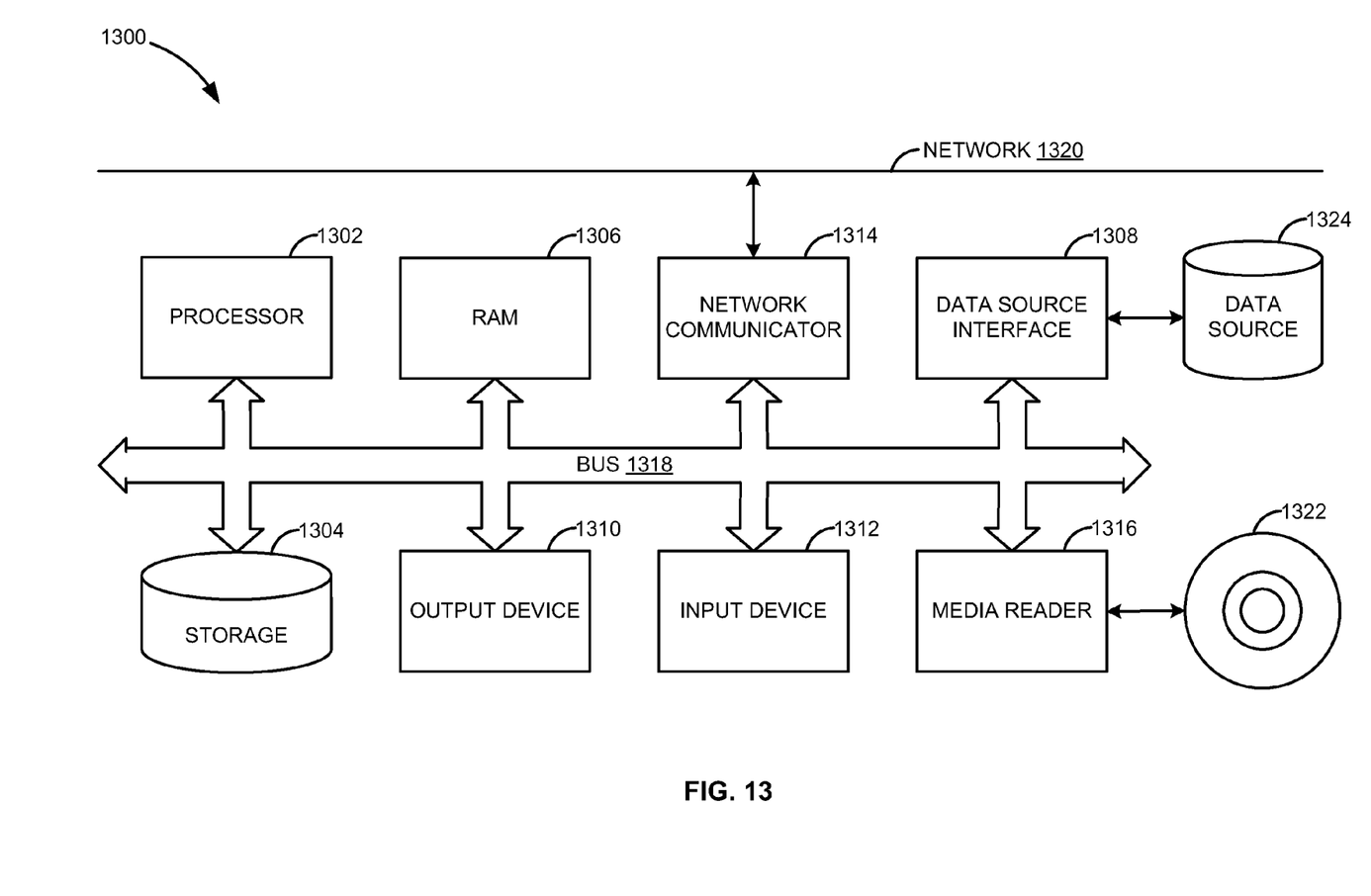
FIG. 13 is a block diagram illustrating a computing environment in which the techniques described for communicating with a plurality of remote systems, according to an embodiment.

FIG. 13 is a block diagram of an exemplary computer system 1300. The computer system 1300 includes a processor 1302 that executes software instructions or code stored on a computer readable storage medium 1322 to perform the above-illustrated methods of the invention. The computer system 1300 includes a media reader 1316 to read the instructions from the computer readable storage medium 1322 and store the instructions in storage 1304 or in random access memory (RAM) 1306. The storage 1304 provides a large space for keeping static data where at least some instructions could be stored for later execution. The stored instructions may be further compiled to generate other representations of the instructions and dynamically stored in the RAM 1306. The processor 1302 reads instructions from the RAM 1306 and performs actions as instructed. According to one embodiment of the invention, the computer system 1300 further includes an output device 1310 (e.g., a display) to provide at least some of the results of the execution as output including, but not limited to, visual information to users and an input device 1312 to provide a user or another device with means for entering data and/or otherwise interact with the computer system 1300. Each of these output devices 1310 and input devices 1312 could be joined by one or more additional peripherals to further expand the capabilities of the computer system 1300. A network communicator 1314 may be provided to connect the computer system 1300 to a network 1320 and in turn to other devices connected to the network 1320 including other clients, servers, data stores, and interfaces, for instance. The modules of the computer system 1300 are interconnected via a bus 1318. Computer system 1300 includes a data source interface 1308 to access data source 1324. The data source 1324 can be accessed via one or more abstraction layers implemented in hardware or software. For example, the data source 1324 may be accessed by network 1320. In some embodiments the data source 1324 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. A computer implemented method for communicating with a plurality of remote systems, the method comprising:
   providing a user interface for receiving a remote data query at a central data requesting system;
   in response to receiving a remote execution request at the user interface, sending the remote data query for execution in parallel from the central data requesting system to a plurality of remote systems, wherein sending the remote data query for execution comprises:
      sending the remote data query for execution at a plurality of data pools corresponding to the plurality of remote systems, wherein data in a first data pool is different from data in a second data pool of the plurality of data pools;
   receiving asynchronously, at the central data requesting system, a first query result of the remote data query from the first data pool and a second query result from the second data pool from at least one corresponding remote system of the plurality of remote systems, wherein the first query result and the second query result are independent of one another;
   analyzing a combination of the received first query result and the second query result at the central data requesting system; and
   generating and presenting a graph in the user interface at the central data requesting system based on the received first query result and the second query result.

2. The computer implemented method according to claim 1, further comprising:
   waiting for a pre-determined timeout period for receiving a query result from a remote system of the plurality of remote systems.

3. The computer implemented method according to claim 2, further comprising:
   determining that the remote system of the plurality of remote systems is unresponsive when the query result is not received in the pre-determined timeout period; and
   ignoring the query result received after the pre-determined timeout period.

4. An article of manufacture including a computer readable storage medium to tangibly store instructions, which when executed by a computer, cause the computer to:
   provide a user interface for receiving a remote data query at a central data requesting system;
   in response to receiving a remote execution request at the user interface, send the remote data query for execution in parallel from the central data requesting system to a plurality of remote systems, wherein sending the remote data query for execution comprises:

send the remote data query for execution at a plurality of data pools corresponding to the plurality of remote systems, wherein data in a first data pool is different from data in a second data pool of the plurality of data pools;

receive asynchronously, at the central data requesting system, a first query result of the remote data query from the first data pool and a second query result from the second data pool from at least one corresponding remote system of the plurality of remote systems, wherein the first query result and second query result are independent of one another;

analyze a combination of the received first query result and the second query result at the central data requesting system; and generate and present a graph in the user interface at the central data requesting system based on the received first query result and the second query result.

5. The article of manufacture according to claim 4, further comprising instructions which when executed by the computer further causes the computer to:

wait for a pre-determined timeout period for receiving a query result from a remote system of the plurality of remote systems.

6. The article of manufacture according to claim 5, further comprising instructions which when executed by the computer further causes the computer to:

determine that the remote system of the plurality of remote systems is unresponsive when the query result is not received in the pre-determined timeout period; and ignore the query result received after the pre-determined timeout period.

7. A computer system for communicating with a plurality of remote systems, the computer system comprising:

a memory to store a program code; and a processor communicatively coupled to the memory, the processor configured to execute the program code to:

provide a user interface for receiving a remote data query at a central data requesting system;

in response to receiving a remote execution request at the user interface, send the remote data query for execution in parallel from the central data requesting system to a plurality of remote systems, wherein sending the remote data query for execution comprises:

send the remote data query for execution at a plurality of data pools corresponding to the plurality of remote systems, wherein data in a first data pool is different from data in a second data pool of the plurality of data pools;

receive asynchronously, at the central data requesting system, a first query result of the remote data query from the first data pool and a second query result from the second data pool from at least one corresponding remote system of the plurality of remote systems, wherein the first query result and second query are independent of one another;

analyze a combination of the received first query result and the second query result at the central data requesting system; and generate and present a graph in the user interface at the central data requesting system based on the received first query result and the second query result.

8. The system of claim 7, wherein the processor further executes the program code to:

wait for a pre-determined timeout period for receiving a query result from a remote system of the plurality of remote systems.

9. The system of claim 8, wherein the processor further executes the program code to:

determine that the remote system of the plurality of remote systems is unresponsive when the query result is not received in the pre-determined timeout period; and ignore the query result received after the pre-determined timeout period.

\* \* \* \* \*